(12) United States Patent
Yang et al.

(10) Patent No.: US 10,411,403 B2
(45) Date of Patent: Sep. 10, 2019

(54) CARD SOCKET FOR ELECTRONIC DEVICE

(71) Applicant: Molex, LLC, Lisle, IL (US)

(72) Inventors: In Chull Yang, Ansan (KR); Jeong Yong Park, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/510,137

(22) PCT Filed: Oct. 16, 2015

(86) PCT No.: PCT/KR2015/010946
§ 371 (c)(1),
(2) Date: Mar. 9, 2017

(87) PCT Pub. No.: WO2016/060510
PCT Pub. Date: Apr. 21, 2016

(65) Prior Publication Data
US 2017/0310043 A1 Oct. 26, 2017

(30) Foreign Application Priority Data

Oct. 17, 2014 (KR) .................. 10-2014-0140997
Mar. 27, 2015 (KR) .................. 10-2015-0043507

(51) Int. Cl.
*H01R 13/629* (2006.01)
*G06K 13/08* (2006.01)
(Continued)

(52) U.S. Cl.
CPC ....... *H01R 13/629* (2013.01); *G06K 13/0831* (2013.01); *H01R 12/71* (2013.01);
(Continued)

(58) Field of Classification Search
CPC .. H01R 12/7094; H01R 12/721; H01R 12/85; H01R 12/87; H01R 13/70; H01R 13/71; H01R 13/703; H01R 13/7036
(Continued)

(56) References Cited

U.S. PATENT DOCUMENTS 5,334,034 A * 8/1994 Reichardt ............ G06K 7/0021
200/51.1
6,126,464 A * 10/2000 Chang ................. H01R 13/7034
235/441
(Continued)

FOREIGN PATENT DOCUMENTS

CN 2554818 Y 6/2003
CN 201369423 Y 12/2009
(Continued)

OTHER PUBLICATIONS

Notice of Allowance received for Korean Patent Application No. 10-2015-0043507, dated May 23, 2016, 2 pages. (1 page of English Translation and 1 pages of Official Copy).
(Continued)

*Primary Examiner* — Edwin A. Leon
*Assistant Examiner* — Milagros Jeancharles
(74) *Attorney, Agent, or Firm* — Molex, LLC (57) ABSTRACT

The present disclosure relates to a card socket for an electronic device and, more particularly, to a card socket for an electronic device having an improved card insertion confirmation structure, wherein the structure of a card insertion confirmation terminal, which senses full insertion of a card or a tray into a card socket, is changed so as to improve stability of insertion of the card or the tray.

15 Claims, 8 Drawing Sheets

(51) Int. Cl.
  *H01R 12/71* (2011.01)
  *H01R 13/14* (2006.01)
  *H01R 13/193* (2006.01)
  *H01R 13/703* (2006.01)

(52) U.S. Cl.
  CPC .......... *H01R 13/14* (2013.01); *H01R 13/193* (2013.01); *H01R 13/7033* (2013.01)

(58) Field of Classification Search
  USPC ............................ 439/153, 159, 188, 620.01
  See application file for complete search history.

(56) References Cited

U.S. PATENT DOCUMENTS

| | | | | |
|---|---|---|---|---|
| 6,425,775 B1* | 7/2002 | Chang | ................. | G06K 7/0069 439/188 |
| 6,431,893 B1* | 8/2002 | Chang | ................. | H01R 12/7094 439/188 |
| 6,655,590 B1 | 12/2003 | McFeely et al. | | |
| 6,692,277 B2* | 2/2004 | Hu | ................. | H01R 13/7033 439/188 |
| 6,719,577 B2* | 4/2004 | Nogami | ................. | G06K 7/0021 439/188 |
| 6,764,327 B2* | 7/2004 | Yu | ................. | H01R 13/7033 439/188 |
| 6,899,557 B2 | 5/2005 | Hirata | | |
| 7,059,909 B1* | 6/2006 | Tseng | ................. | G06K 7/0021 439/630 |
| 7,159,773 B2* | 1/2007 | Yang | ................. | G06K 7/003 235/441 |
| 7,258,278 B2* | 8/2007 | Laitinen | ................. | G06K 13/08 235/451 |
| 7,682,197 B2 | 3/2010 | Wang | | |
| 7,726,991 B2* | 6/2010 | Ma | ................. | H01R 13/703 439/188 |
| 7,794,249 B2* | 9/2010 | Yu | ................. | H01R 13/633 439/159 |
| 7,837,488 B2* | 11/2010 | Wu | ................. | G06K 7/0021 439/188 |
| 7,865,210 B2 | 1/2011 | Wang et al. | | |
| 7,972,156 B2* | 7/2011 | Zhou | ................. | H01R 12/7094 439/188 |
| 8,075,324 B2* | 12/2011 | Yamaji | ................. | H01R 13/6295 439/188 |
| 8,251,722 B2* | 8/2012 | Tsai | ................. | H01R 43/16 439/188 |
| 8,277,238 B2* | 10/2012 | Matsumoto | ................. | G06K 7/0043 439/188 |
| 8,500,472 B2* | 8/2013 | Shimoyama | ................. | H01R 13/7038 439/188 |
| 8,608,494 B2 | 12/2013 | Yang | | |
| 8,662,908 B2* | 3/2014 | Harada | ................. | H01R 27/00 439/188 |
| 9,270,063 B2* | 2/2016 | Tang | ................. | H01R 12/7094 |
| 9,444,196 B2* | 9/2016 | Wang | ................. | G06K 19/00 |
| 9,445,521 B2* | 9/2016 | Tan | ................. | G06K 7/0021 |
| 9,543,999 B2* | 1/2017 | Kusuhara | ................. | H01R 13/2442 |
| 2004/0023538 A1* | 2/2004 | Masson | ................. | G06K 7/0069 439/188 |
| 2006/0076409 A1* | 4/2006 | Ko | ................. | G06K 7/0021 235/441 |
| 2006/0079106 A1 | 4/2006 | Kikuchi | | |
| 2006/0183378 A1* | 8/2006 | Tanaka | ................. | H01R 13/7032 439/630 |
| 2006/0273174 A1* | 12/2006 | Laitinen | ................. | G06K 13/08 235/441 |
| 2008/0090437 A1* | 4/2008 | Huang | ................. | H01R 13/2414 439/188 |
| 2010/0159724 A1* | 6/2010 | Ida | ................. | G06K 13/08 439/159 |
| 2011/0104920 A1* | 5/2011 | Matsunaga | ................. | H01R 12/716 439/152 |
| 2012/0058657 A1* | 3/2012 | Hu | ................. | H01R 12/7094 439/188 |
| 2012/0202366 A1* | 8/2012 | Ho | ................. | H01R 13/6271 439/153 |
| 2013/0288535 A1* | 10/2013 | You | ................. | H01R 24/62 439/634 |
| 2014/0315404 A1* | 10/2014 | Wang | ................. | G06K 13/08 439/159 |

FOREIGN PATENT DOCUMENTS

| | | |
|---|---|---|
| JP | 3101218 U | 10/2004 |
| KR | 2009-0023062 A | 3/2009 |
| KR | 10-1228837 B1 | 2/2013 |
| TW | M409566 U | 8/2011 |
| TW | M475715 Y | 4/2014 |
| TW | M531071 U | 10/2016 |
| WO | 2016/060510 A1 | 4/2016 |

OTHER PUBLICATIONS

International Search Report received for PCT Patent Application No. PCT/KR2015/010946, dated Feb. 17, 2016, 7 pages.
International Preliminary Report on Patentability received for PCT Patent Application No. PCT/KR2015/010946, dated Apr. 27, 2017, 6 pages.

* cited by examiner

CARD SOCKET FOR ELECTRONIC DEVICE

RELATED APPLICATIONS

This application is a national phase of International Application No. PCT/KR2015/010946, filed Oct. 16, 2015, which claims priority to Korean Application No. 10-2014-0140997, filed Oct. 17, 2014 and Korean Application No. 10-2015-0043507, filed Mar. 27, 2015, all of which are incorporated herein by reference in their entireties.

TECHNICAL FIELD

This disclosure relates to a card socket for use in electronic devices, and more specifically to a card socket for use in electronic devices that can ensure reliable conductive performance by removing oxide films or impurities, etc. by forming a friction zone in the inter-terminal contact part, and can improve the stability of card or tray insertion through a change in the structure of the card insertion confirmation terminal that determines whether the card or tray has been fully inserted into the card socket.

BACKGROUND ART

Various cards (memory cards/SIM cards) storing the personal information, etc., of diverse subscribers, such as their telephone number, are used in electronic devices such as mobile phones. Forms of card insertion include inserting the card alone, and inserting the card mounted on a separate tray.

In these types of card sockets, a card insertion confirmation terminal is furnished that senses when the card or tray has been fully inserted. Generally, the card insertion confirmation terminal consists of a detect terminal that is contacted to the front end of the card tray when the card tray is inserted, and switch terminal that is pushed backward and contacts the detect terminal when the card tray has been fully inserted.

A card insertion recognition terminal structure having this configuration is disclosed in Republic of Korea Registered Patent No. 1228837 (hereinafter "Prior Art Reference 1") and U.S. Pat. No. 7,865,210 (hereinafter "Prior Art Reference 2").

The prior art references are generally configured so that upon card/tray insertion, the detect terminal is pushed backward and then contacted to the switch terminal. The detect terminal has internal elasticity such that when the card/tray is withdrawn, after it has been pushed backward upon card/tray insertion, it returns to its original state.

Likewise, in the case of the prior art references, because the detect terminal has internal elasticity that pushes backward when the card/tray is inserted, force is continuously applied to the card/tray by the detect terminal in the withdrawal direction. Thus, there is a risk of an external nonconformity between the card tray and set, due to the card/tray protruding outward.

In addition, there is a problem that grounding defects occur due to the penetration of impurities, etc., or the formation of an oxide film between the detect terminal and the contact part of the switch terminal, leading to unreliable conductivity.

Patent Reference 1: Republic of Korea Registered Patent Gazette No. 1228837 (issued 2013 Feb. 15).

Patent Reference 2: U.S. Pat. No. 7,865,210 (granted 2011 Jan. 4).

SUMMARY

The purpose of this disclosure, which has been devised in order to address the above-described problems of the prior art, is to provide a card socket for use in electronic devices that can enhance card/tray insertion stability.

In addition, another purpose of this disclosure relates to a card socket for electronic device use that can remove oxide films or impurities by forming a friction zone on the inter-terminal contact part of the socket.

The card socket for electronic device use according to Preferred Embodiment 1 of this disclosure comprises: a fixing part that comprises a detect terminal furnished in the insertion space of the housing and is pushed downward by a card/tray when the card/tray is inserted and a switch terminal that is furnished below the detect terminal in the housing so that it contacts the detect terminal, wherein the detect terminal is fixed to the housing; and a pushing portion that is connected to the fixing part and located within the insertion space of the housing and contacts the card/tray so as to be pushed downward while contacting the switch terminal; formed such that either the part of the pushing portion that contacts the card/tray is connected to the fixing part and is located below the part that moves in a cantilevered fashion, or the of the part that contacts the card/tray is equal to or less than the thickness of the floor of the housing.

In addition, said detect terminal may comprise: a 1st housing fixation part that is the portion that is fixed to the rear end of said housing; a 1st contact part that has internal elasticity and is installed height extending toward either side in the rear part of the insertion space of said housing, having a first end connected to the 1st housing fixation part while a second end contacts the switch terminal, so as to make up the pushing portion; and a push guide part that is formed sloping downward at the front, at a location spaced apart from the second end of said 1st contact part, so that the inserted card/tray slides along the sloped surface and is guided to as to push the 1st contact part, making up the pushing portion.

In addition, when the card/tray pushes on said 1st contact part while sliding along said push guide part, the 1st contact part is pushed downward in an oblique direction as it approaches the second end.

In addition, the 1st contact part may comprise a connecting surface that is connected to the 1st housing fixation part; a downward-sloping surface that is bent sloping downward from the connecting surface; and an upward-sloping surface bent upward from the downward-sloping surface.

In addition, the switch terminal may comprise: a 2nd housing fixation part that is fixed to the housing; and a 2nd contact part that is bent upward from the 2nd housing fixation part.

In addition, on the bottom surface of the insertion space of the housing, a catch lip is formed that will prevent the top of the second end of the 1st contact part from slipping when the card/tray is mis-inserted, so that a fixed interval is maintained between the 1st contact part and 2nd contact part.

In addition, because if the end of said push guide part is pushed to a position below the bottom surface of the housing, there is a risk of contacting the PCB so that the PCB is damaged, in order to prevent this, the position of the push guide part that is contacted to the card/tray is below the fixing point, i.e. the part of the 1st contact part that is connected to the 1st housing fixation part, which is moved in a cantilever fashion; or alternatively, the push guide part is formed so as to have a height that is less than the thickness of the base surface of the housing.

The card socket for electronic device use according to Preferred Embodiment 2 of this disclosure may comprise: a detect terminal that is installed inside the insertion space of the housing and is pushed downward by the card/tray when the card/tray is inserted into the insertion space; and a switch terminal that is installed on the top of the detect terminal the insertion space of the housing, so that contact with the detect terminal is released as the detect terminal is pushed downward.

In addition, on said detect terminal, at the end of the pushing portion that is pushed by said card/tray, a 1st contact part is formed sloping upward toward the rear, and on said switch terminal, a 2nd contact part is formed that is formed sloping downward toward the front and is contacted to the 1st contact part; and wherein a friction zone is formed between the 1st contact part and 2nd contact part when said detect terminal is pushed downward, so that impurities or oxide films formed on the 1st contact part and 2nd contact part may be removed.

In addition, when said detect terminal is pushed downward, the friction potential with said switch terminal, caused by the slope zone movement between said 1st contact part and said 2nd contact part, may be greater than the pushing potential of said detect terminal, due to the movement of the 1st contact part along the sloped surface of the 2nd contact part.

In addition, the upward slope angle of the 1st contact part may be formed greater than the downward slope angle of the 2nd contact part, so that the corner of the 1st contact part rubs against the sloped surface of the 2nd contact part.

In addition, the upward slope angle of the 1st contact part may be formed smaller than the downward slope angle of the 2nd contact part, so that the corner of the 2nd contact part rubs against the sloped surface of the 1st contact part.

The following effects may be expected from the card socket for use in electronic devices according to this disclosure.

First, because in this disclosure the detect terminal is configured so as to contact the switch terminal upon being pushed downward by the card/tray when the card/tray is inserted, a force acts in the thickness direction, i.e. the direction in which the card/tray is lifted upward by the detect terminal and switch terminal each having elasticity. Accordingly, since the card/tray is not subject to a force in the withdrawal direction, there is no risk of an exterior nonconformity between the card/tray and the set, and because the method of push-in insertion heightens the frictional force with the metal shell covering the housing, an enhanced insertion stability is achieved.

Second, in this disclosure, stability of contact with the detect terminal and switch terminal may be maintained even if the thickness of the card/tray is increased, because the 1st contact part may be readily pushed by the push guide part that makes up the detect terminal, and the contact area with the switch terminal may be increased relative to existing detect terminals while forming the part of the 1st contact part that contacts the switch terminal at a location that is further toward the end than the part that contacts the switch terminal.

Third, in this disclosure, because the 1st contact part of the detect terminal is kept in a horizontal state while maintaining a fixed interval with the 2nd contact part of the switch terminal, by virtue of the catch lip formed on the housing, the occurrence of shorts between the detect terminal and switch terminal may be greatly curtailed.

Fourth, in this disclosure, because the detect terminal and card terminal are located below the card/tray when the card/tray is inserted, the size of the overall card socket may be reduced relative to a card socket of the prior art wherein the detect terminal and switch terminal are located in front of the card/tray.

Fifth, in this disclosure, the occurrence of grounding defects may be prevented by ensuring reliable conductivity, such that even if conductivity defects are present due to impurities or oxide films between the contact parts of the detect terminal and switch terminal, because the terminal corners are configured to scratch the contact surface due to the formation of a sloped zone on the contact parts of the detect terminal and switch terminal.

Sixth, this disclosure may improve the stability of conductivity, due to maximizing the area over which friction occurs, because the contact potential with the switch terminal 600 due to movement between the 1st contact part 530 and 2nd contact part 620 is greater than the pressure potential of the detect terminal 500, because the 1st contact part of the detect terminal moves along the 2nd contact part of the switch terminal when the detect terminal is pushed downward.

DETAILED DESCRIPTION OF THE PREFERRED EMBODIMENTS

Hereinbelow, a preferred embodiment of the card socket for electronic device use will be described in detail with reference to the attached drawings.

Figure 1:
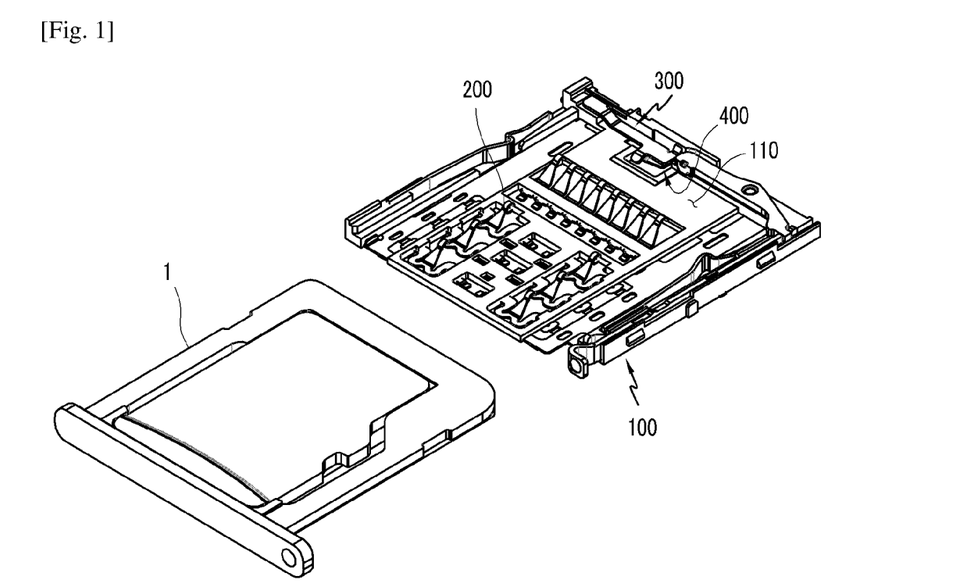
FIG. 1 is a perspective view showing the card socket for use in electronic devices according to Preferred Embodiment 1 of this disclosure, when a card/tray has been inserted therein.

FIG. 1 is a perspective view showing the card socket for use in electronic devices according to Preferred Embodiment 1 of this disclosure, when a card/tray has been inserted therein. Note that FIG. 1 is a top view omitting the metal shell that covers the housing.

The housing 100 that makes up the card socket has front end into which a card/tray 1 is inserted and an insertion space 110 that is opened toward the top and covered by a metal shell. On the basal surface of the insertion space 110, a contact terminal 200 is furnished that contacts the card, and at the back part of the insertion space 110, a detect terminal 300 and switch terminal 400 are furnished as a card insertion confirmation terminal that detects when a card/tray 1 has been inserted into the rear part of the insertion space 110.

Figure 2:
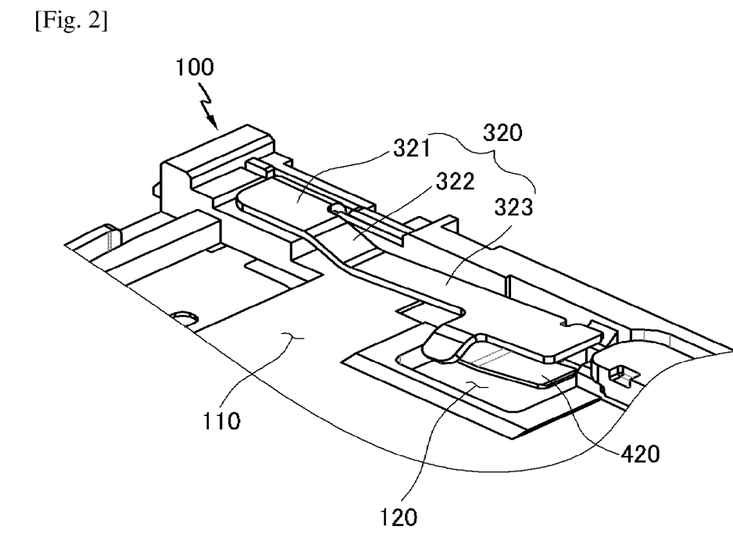
FIG. 2 is a perspective view of the detect terminal and switch terminal furnished on the housing.
Figure 3:
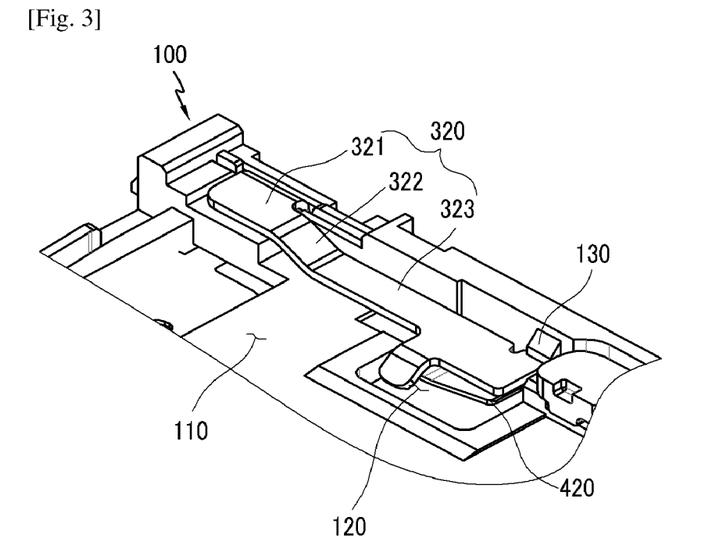
FIG. 3 is a perspective view showing the gap between the detect terminal and switch terminal being held constant.
Figure 4:
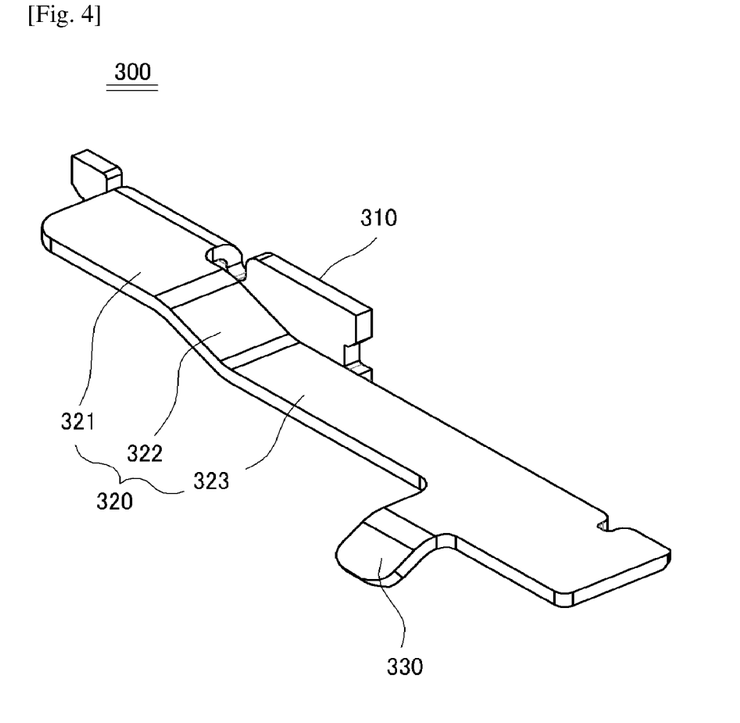
FIG. 4 shows a perspective view of the detect terminal.
Figure 5:
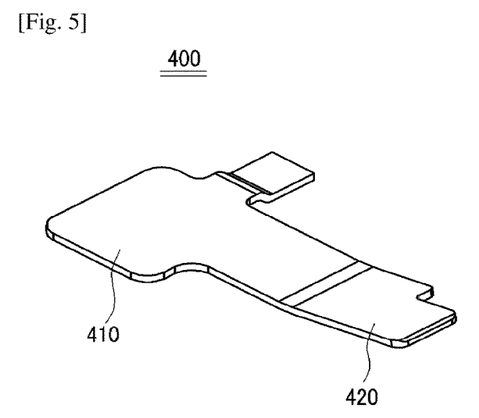
FIG. 5 shows a perspective view of the switch terminal.

FIG. 2 is a perspective view of the detect terminal and switch terminal furnished on the housing; FIG. 3 is a perspective view showing the gap between the detect terminal and switch terminal being held constant; FIG. 4 shows a perspective view of the detect terminal; FIG. 5 shows a perspective view of the switch terminal.

At the back part of the insertion space 110 of the housing 100, a detect terminal 300 and switch terminal 400 are furnished above and below as a card insertion confirmation terminal that detects when a card/tray 1 has been inserted.

As the card/tray 1 is inserted into the insertion space 110, the card/tray 1 pushes the detect terminal 300 downward so as to contact the switch terminal 400, so that the card/tray 1 is recognized to have been inserted into the insertion space 110. Accordingly, because the detect terminal 300 and switch terminal 400 are in contact vertically, the card/tray 1 is not affected by any force in the withdrawal direction due to the detect terminal 300, and thus there is no risk of an exterior nonconformity between the card/tray 1 and set.

In other words, if the detect terminal 300 and switch terminal 400 are in contact, it may be recognized that the card tray 1 is not inserted or has not been completely inserted, and if the detect terminal 300 and switch terminal 400 are not in contact but are separated, it may be recognized that the card tray 1 has been fully and completely inserted into the insertion space 110.

Because the detect terminal 300 has elasticity, it is elastically pushed by the card/tray 1, and because the switch terminal 400 also has elasticity, it is elastically contacted to the detect terminal 300.

The detect terminal 300 comprises a 1st housing fixing part 310, 1st contact part 320, and push guide part 330.

The 1st housing fixing part 310 may be fixed by insertion into an insertion recess (not shown) formed at the rear end of the housing 100, but is not limited thereto and may also be formed integrally with the housing 100 by molding.

The 1st contact part 320 is installed extending to either side in the rear part of the insertion space 110, and has elasticity; a first end is connected integrally with the 1st housing fixing part 310, while the second end is contacted to the switch terminal 400. This 1st contact part 320 comprises a connecting surface 321 that integrally connects with the 1st housing fixing part 310; a downward-sloping surface 322 that is bent at a downward slope from the connecting surface 321; and an upward-sloping surface 323 that is bent sloping upward from the downward-sloping surface 322. The end of the upward-sloping surface 323 contacts the switch terminal 400.

The push guide part 330 is formed sloping downward at the front in a location set apart from the end of the upward-sloping surface 323, i.e. at the far end of the 1st contact part 320, so that it guides the card/tray 1 inserted into the insertion space 110 to push on the 1st contact part 320 as it is slid along the sloped surface.

The switch terminal 400 comprises a 2nd housing fixing part 410 and a 2nd contact part 420.

The 2nd housing fixing part 410 may be formed integrally with the housing 100 by molding.

The 2nd contact part 420 is bent at an upward slope from the 2nd housing fixing part 410, so that it has internal elasticity. The end of the 2nd contact part 420 is contacted to the detect terminal 300.

On the bottom surface of the insertion space 110, a 2nd contact part 420 is located, and a through part 120 is formed that passes through in a vertical direction so as to enable vertical elastic deformation. Part of the 2nd housing fixing part 410 that is connected to the 2nd contact part 420 is also located in the through part 120.

On the rear surface of the insertion space 110, a catch lip 130 is formed projecting outward so as to prevent the 1st contact part 320 of the detect terminal 300 from lifting upward when the card/tray 1 is mis-inserted, so that the gap between the 1st contact part 320 and the 2nd contact part 420 of the switch terminal 400 is kept constant.

Before catching the 1st contact part 320 of the detect terminal 300 on the catch lip 130, the 1st contact part 320 is formed sloping upward as shown in FIG.>2, and then the 1st contact part 320 is pushed so that when it catches on the catch lip 130 as shown in FIG. 3, the 1st contact part 320 maintains a horizontal state and keeps a constant interval with the 2nd contact part 420. Accordingly, the incidence of shorts between the detect terminal 300 and switch terminal 400 may be greatly reduced.

Figure 6:
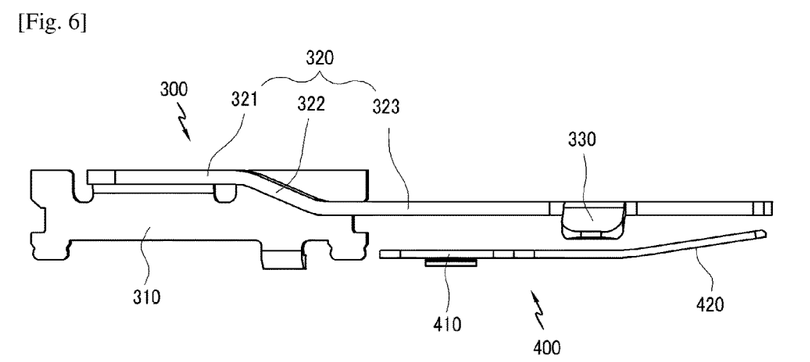
FIG. 6 shows a view in which, prior to card/tray insertion, the gap between the 1st contact part of the detect terminal and the 2nd contact part of the switch terminal is held constant.
Figure 7:
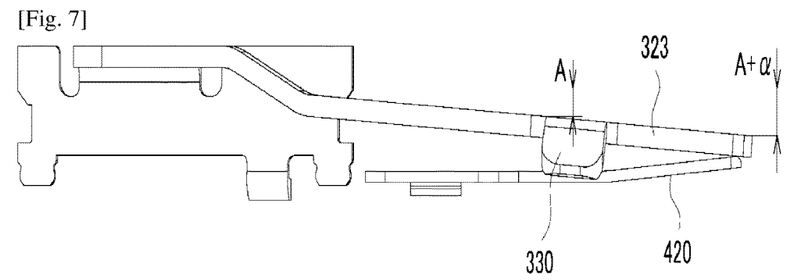
FIG. 7 shows a view in which, during card/tray insertion, the 1st contact part and the 2nd contact part are brought into contact.

FIG. 6 shows a view in which, prior to card/tray insertion, the gap between the 1st contact part of the detect terminal and the 2nd contact part of the switch terminal is held constant; FIG. 7 shows a view in which, during card/tray insertion, the 1st contact part and the 2nd contact part are brought into contact.

As described above, while caught on the catch lip 130 of the 1st contact part 320, the 1st contact part 320 maintains a constant gap with the 2nd contact part 420 while remaining in a horizontal state, as shown in FIG. 6. In this case the 2nd contact part 420 slopes upward.

If the card/tray 1 is inserted so as to push the 1st contact part 320, then as shown in FIG. 7, the 1st contact part 320 is pushed sloping downward, and is also pushed as the end of the 1st contact part 320 and the end of the 2nd contact part 420 contact each other. Finally, when it has been pushed, the 1st contact part 320 is tilted downward and the 2nd contact part 420 is in a horizontal state; the ends of the two contact parts 320 420 are in contact with one another.

As shown in FIG. 6, before the 1st contact part 320 is pushed by the card/tray 1, the end of the push guide part 330, formed sloping downward and forward from the 1st contact part 320, is located at a lower place than the 1st contact part 320. Accordingly, when the card/tray 1 is inserted, the card/tray 1 indirectly pushes the 1st contact part 320 while sliding along the upper sloped surface of the push guide part 330, and additionally as it is inserted, it is directly contacted to the upper surface of the 1st contact part 320 while pushing directly on the 1st contact part 320.

As the 1st contact part 320 is pushed by the card/tray 1, it is pushed downward in an oblique direction; thus, the end contact portion does not contact the card/tray 1.

Because the part of the 1st contact part 320 that contacts the switch terminal 400 without directly contacting the card/tray 1 is formed further toward the end than the part that directly contacts the card/tray 1, when the 1st contact part 320 is pushed by the card/tray 1, the part that contacts the switch terminal 400 moves a great deal more (A+α). Accordingly, even if the distance by which the detect terminal 300 is pushed is relatively reduced due to the thickness of the card/tray 1, because the contact area with the switch terminal 400 is increased relative to the detect terminals of the prior art, the stability of contact between the 1st contact part 320 and 2nd contact part 420 may be maintained.

Figure 8:
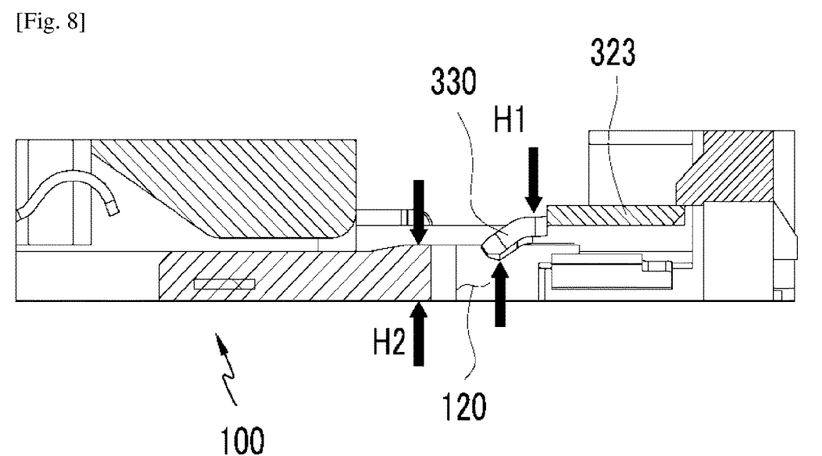
FIG. 8 is a cross-section showing the proportion between the housing and the detect terminal.

FIG. 8 is a cross-section showing the proportion between the housing and the detect terminal.

A push guide part 330 that forms the detect terminal 300 is located within the through part 120 formed in the basal surface of the insertion space of the housing 100. Accordingly, when the detect terminal 300 is pushed by insertion of the card/tray 1, the part that is pushed, namely the push guide part 330, is caused to descend within the through part 120. In this case, because if the end of said push guide part 330 is pushed to a position below the bottom surface of the housing 100, there is a risk of contacting the PCB so that the PCB is damaged, in order to prevent this, the position of the part that contacts the card/tray 1 is below the fixing point that moves in cantilever fashion, i.e. below the connecting surface 321 of the 1st contact part 320; or alternatively, the push guide part 330 may preferably be formed so as to have a height (H1) that is equal to or less than the thickness (H2) of the base surface of the housing 100.

Figure 9:
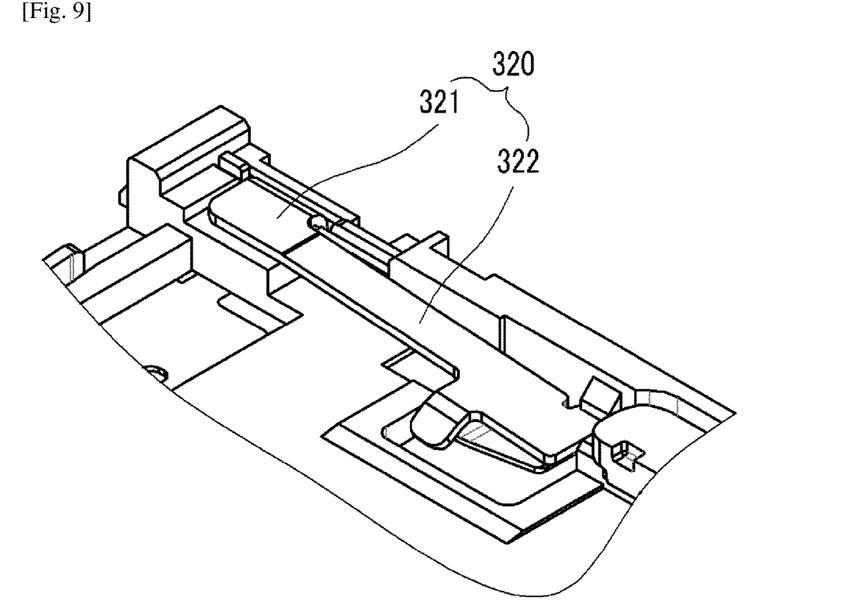
FIG. 9 shows a perspective view of a different implementation of the detect terminal.

FIG. 9 shows a perspective view of a different implementation of the detect terminal.

The 1st contact part 320 that makes up the detect terminal 300 has a shape that is bent 1 time. In other words, the 1st contact part 320 may consist of a connecting surface 321 that connects integrally with the 1st housing fixing part 310, and a downward-sloping surface 322 that is bent sloping downward from the connecting surface 321.

The shape of the detect terminal 300 may be formed in diverse ways.

Figure 10:
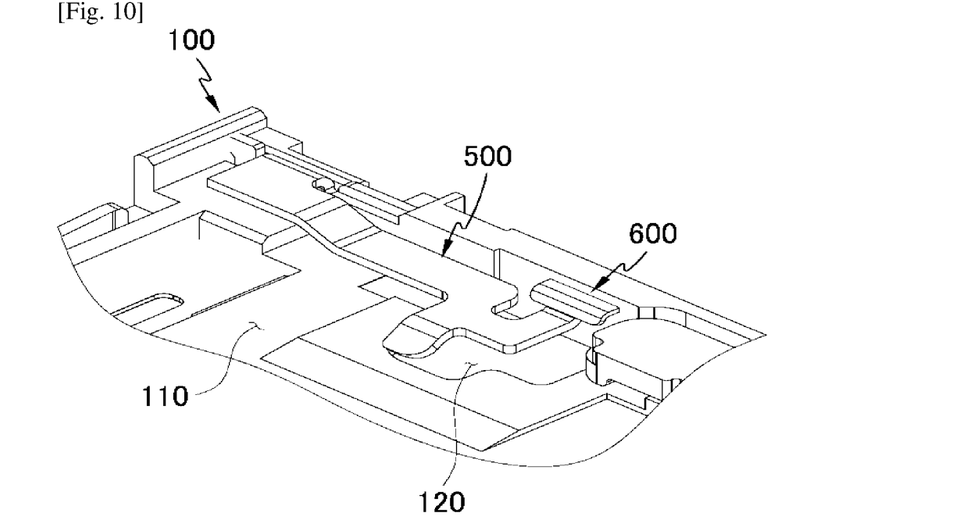
FIG. 10 is a perspective view showing the card socket for use in electronic devices according to Preferred Embodiment 2 of this disclosure, having a detect terminal and a switch terminal furnished on the housing.
Figure 11:
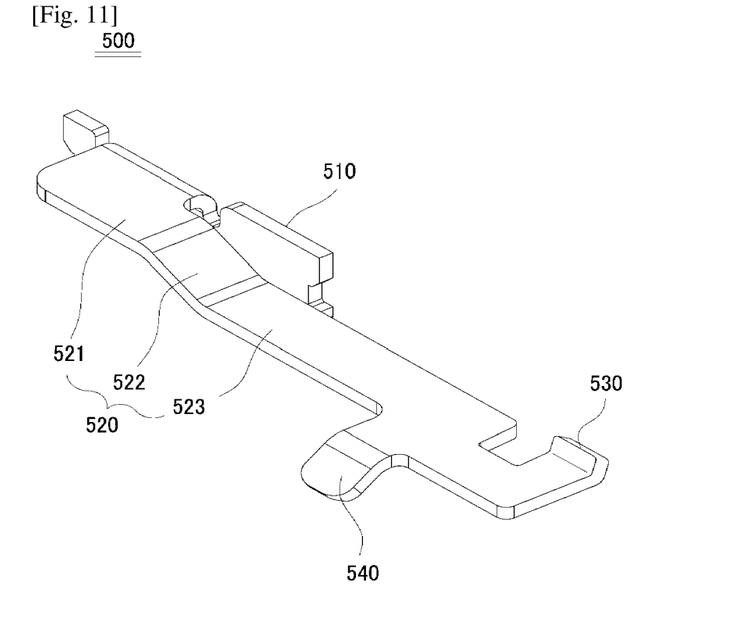
FIG. 11 is a perspective view of the detect terminal.
Figure 12:
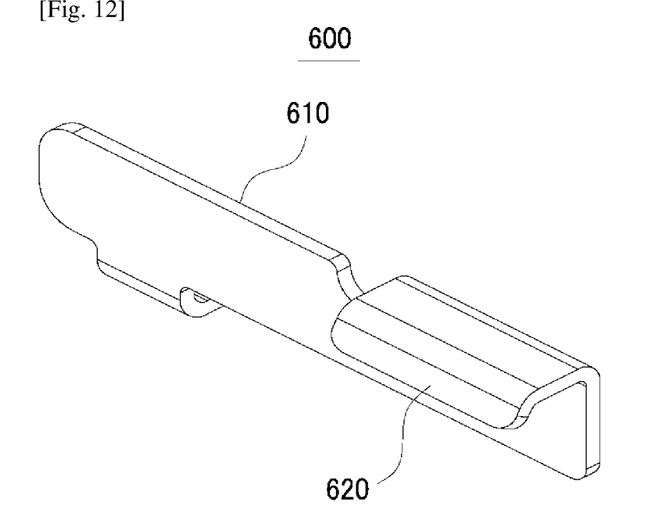
FIG. 12 is a perspective view of the switch terminal.

FIG. 10 is a perspective view showing the card socket for use in electronic devices according to Preferred Embodiment 2 of this disclosure, having a detect terminal and a switch terminal furnished on the housing; FIG. 11 is a perspective view of the detect terminal; FIG. 12 is a perspective view of the switch terminal.

As shown in FIGS. 10 through 12, the card socket for use in electronic devices according to Preferred Embodiment 2 of this disclosure may be furnished above and below with a switch terminal 500 and detect terminal 600, which make up a card insertion confirmation terminal that senses when a card/tray 1 has been inserted into the back portion of the insertion space 110 of the housing 100.

As the card/tray 1 is inserted into the insertion space 110, the card/tray 1 pushes the detect terminal 500 downward so as to break contact with the switch terminal 600, so that the card/tray 1 is recognized to have been inserted into the insertion space 110. As a result, because the detect terminal 500 and switch terminal 600 are in contact vertically, the card/tray 1 is not affected by any force in the withdrawal direction due to the detect terminal 500, and thus there is no risk of an exterior nonconformity between the card/tray 1 and set.

In other words, if the detect terminal 500 and switch terminal 600 are in contact, it may be recognized that the card tray 1 is not inserted or has not been completely inserted, and if the detect terminal 500 and switch terminal 600 are not in contact but are separated, it may be recognized that the card tray 1 has been fully and completely inserted into the insertion space 110.

The detect terminal 500 has elasticity so that when the card/tray 1 is inserted into the insertion space 110 of the housing 100, it is elastically pushed downward by the card/tray 1.

The detect terminal 500 may comprise a 1st housing fixing part 510, leaf spring part 520, 1st contact part 530, and push guide part 540.

The 1st housing fixing part 510 may be fixed by insertion into an insertion recess (not shown) formed at the rear end of the housing 100, but is not limited thereto and may also be formed integrally with the housing 100 by molding.

The leaf spring part 520 is the pushing portion that is pushed by the card/tray 1; it is installed extending in either direction in the rear part of the insertion space 110 of the housing 100, and has internal elasticity. A first end of the leaf spring part 520 is connected integrally with the 1st housing fixing part 510, while a below-described 1st contact part 530 is formed on the second end and is contacted to the switch terminal 600. This leaf spring part 520 may comprise a connecting surface 521 that integrally connects with the 1st housing fixing part 510; a downward-sloping surface 522 that is bent at a downward slope from the connecting surface 521; and an upward-sloping surface 523 that is bent sloping upward from the downward-sloping surface 522.

The 1st contact part 530 is formed bending at an upward direction backward on the second end of the leaf spring part (520), i.e. the end of the upward-sloping surface 523, so as to contact the 2nd contact part 620 of the below-described switch terminal 600.

The push guide part 540 is formed sloping downward at the front in a location set apart from the end of the upward-sloping surface 523 in the direction of the 1st housing fixing part 510, i.e. at the second end of the leaf spring part 520, so that it guides the card/tray 1 inserted into the insertion space 110 to push on the leaf spring part 520 as it is slid along the sloped surface.

The switch terminal 600 is installed on top of the detect terminal 500; as the detect terminal 500 is pushed downward by the card/tray 1, the contact with the detect terminal 500 is broken.

The switch terminal 600 may comprise a 2nd housing fixing part 610 and a 2nd contact part 620.

The 2nd housing fixing part 610 may be formed integrally with the housing 100 by molding, but is not limited thereto and may also be fixed by insertion into an insertion recess (not shown) formed at the rear end of the housing 100.

The 2nd contact part 620 is formed bending downward and forward from the 2nd housing fixing part 610, so as to contact the 1st contact part 530 of the detect terminal 500.

On the bottom surface of the insertion space 110, a 1st contact part 530 and push guide part 540 of the detect terminal 500 are located, and a through part 120 is formed that passes through in a vertical direction so as to enable vertical elastic deformation. In addition, part of the leaf spring part 520 connecting the 1st contact part 530 and push guide part 540 is also located in the through part 120.

A push guide part 540 that forms the detect terminal 500 is located within the through part 120 formed in the basal surface of the insertion space 110 of the housing 100. Accordingly, when the detect terminal 500 is pushed by insertion of the card/tray 1, the part that is pushed, namely the push guide part 540, is caused to descend within the through part 120. In this case, because if the end of said push guide part 540 is pushed to a position below the bottom surface of the housing 100, there is a risk of contacting the PCB so that the PCB is damaged, in order to prevent this, the position of the part that contacts the card/tray 1 is below the fixing point which moves in a cantilever fashion, i.e. below the connecting surface 521 of the leaf spring part 520; or alternatively, the push guide part 540 may preferably be formed so as to have a height that is less than the thickness of the base surface of the housing 100.

Figure 13:
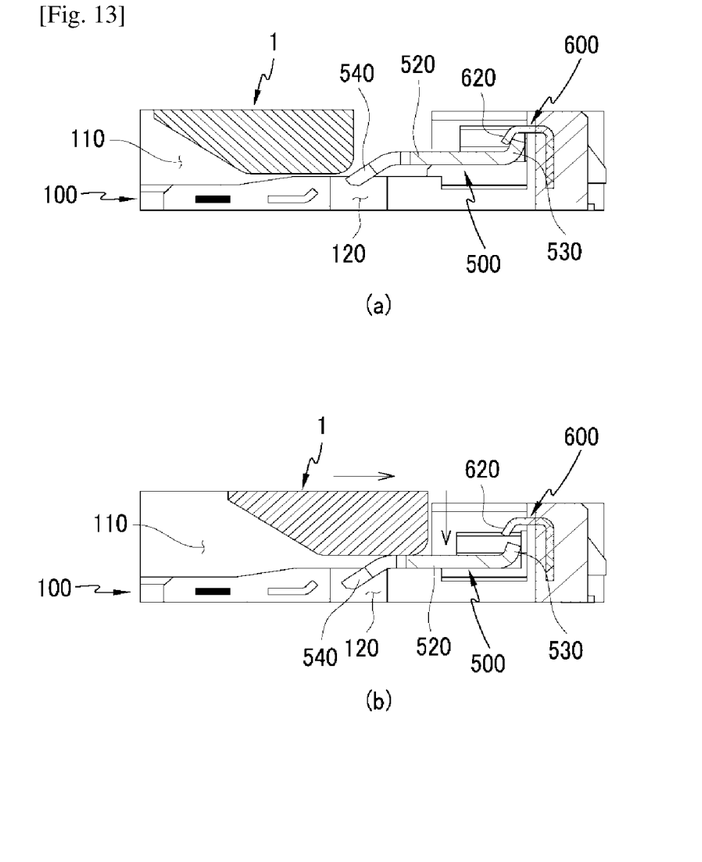
FIGS. 13A and 13B are cross-sections of the state in which contact has been broken between the detect terminal and the switch terminal, due to card/tray insertion.

FIGS. 13A and 13B are cross-sections of the state in which contact has been broken between the detect terminal and the switch terminal, due to card/tray insertion.

As shown in FIG. 13A, if the 1st contact part 530 of the detect terminal 300 and the 2nd contact part 620 of the switch terminal 400, it is recognized that the card/tray 1 has not been inserted or has not been inserted fully.

As shown in FIG. 13B, if the card/tray 1 is inserted into the insertion space 110 of the housing 100, the detect terminal 500 is pushed and caused to move downward by the card/tray 1. Specifically, before the leaf spring part 520 of the detect terminal 500 is pushed by the card/tray 1, the end of the push guide part 540 formed sloping downward and forward from the leaf spring part 520 is located in a lower position than the leaf spring part 520. Accordingly, when the card/tray 1 is inserted, the card/tray 1 indirectly pushes the leaf spring part 520 while sliding along the upper sloped surface of the push guide part 540, and additionally as it is inserted, it is directly contacted to the upper surface of the leaf spring part 520 while pushing directly on the leaf spring part 520.

As the left spring part 520 of the detect terminal 500 moves downward due to the insertion of the card/tray 1, the 2nd contact part 620 of the switch terminal 600 and the 1st contact part 530 of the detect terminal 500 break contact. Likewise, if the detect terminal 500 and switch terminal 600 are not in contact with one another, the card/tray 1 is recognized to have been fully and completely inserted into the insertion space 110.

Figure 14:
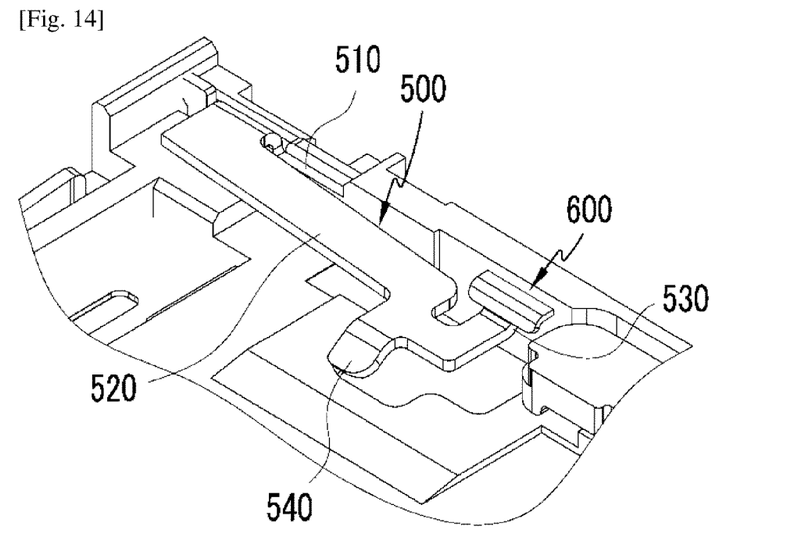
FIG. 14 shows a perspective view of a different implementation of the detect terminal.

FIG. 14 shows a perspective view of a different implementation of the detect terminal.

As shown in FIG. 14, the leaf spring part 520 that makes up the detect terminal 500 may also be configured in a flat cantilever shape. In other words, the leaf spring part 520 may be formed as a flat line without a bending part, but is not limited thereto, and the shape of the detect terminal 500 may be formed in diverse ways.

Figure 15:
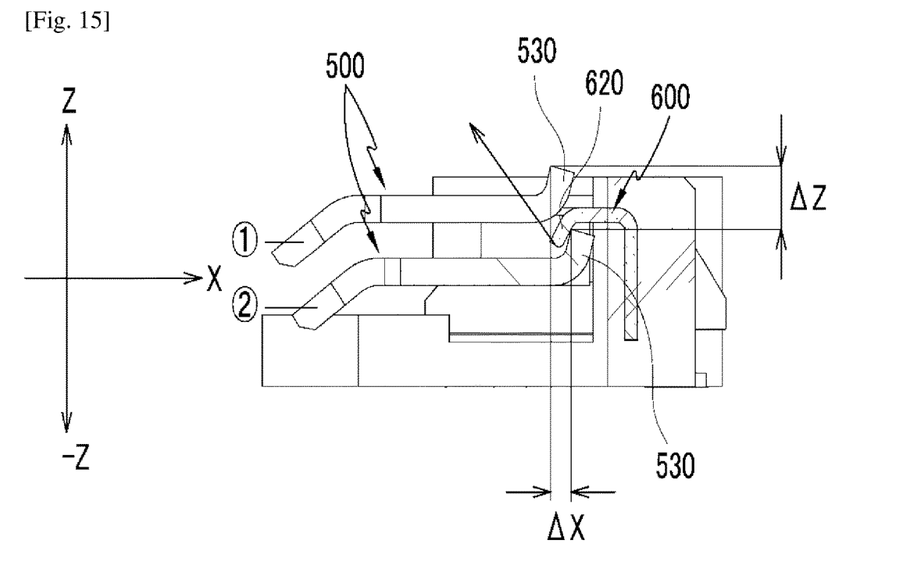
FIG. 15 is a cross-section showing the assembled state of the detect terminal for forming a friction zone on the contact parts of the detect terminal and switch terminal.
Figure 16:
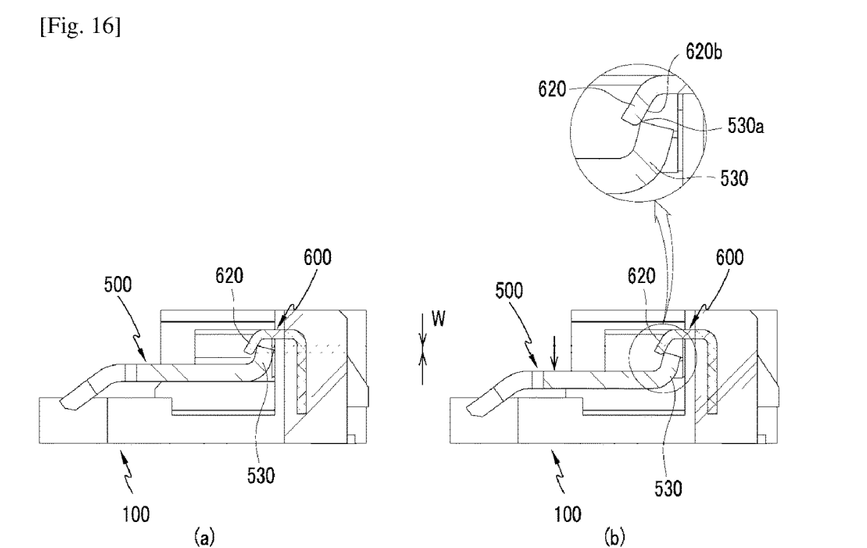
FIGS. 16A and 16B are cross-sections showing the rubbing of the edge of the detect terminal against the sloped surface of the switch terminal when the detect terminal is pushed downward.

FIG. 15 is a cross-section showing the assembled state of the detect terminal for forming a friction zone on the contact parts of the detect terminal and switch terminal; FIGS. 16A and 16B are cross-sections showing the rubbing of the edge of the detect terminal against the sloped surface of the switch terminal when the detect terminal is pushed downward.

As shown in FIGS. 15, 16A and 16B, when the detect terminal 500 is pushed downward by the card/tray 1, a friction zone W is formed between the 1st contact part 530 of the detect terminal 500 and the 2nd contact part 620 of the switch terminal 600, so that even if conductivity defects are present due to impurities or oxide films between the contact parts of the detect terminal 500 and switch terminal 600, these are removed so that the occurrence of grounding defects may be prevented by ensuring reliable conductivity.

Specifically, by configuring a sloped zone on the contact part of the detect terminal 500 and switch terminal 600 so that the corner of the terminal scratches the contact surface causing rubbing to occur. In addition, a torsional force must be applied to the detect terminal 500 in the assembly process, in order to establish a friction-causing mechanism. For example, the detect terminal 500 does not generate a torsional force at the pre-assembly location (1) and a recovering torque of the detect terminal 500 is generated at the post-assembly location (2). Specifically, an X-direction torque is generated due to the X-direction difference ($\Delta X$) between the initial pre-assembly location and final post-assembly location of the detect terminal 500 in the X direction, and a Z-direction torque is generated due to the Z-direction difference ($\Delta Z$) between the initial pre-assembly location and final post-assembly location of the Z-direction detect terminal 500; accordingly, a recovering torque of the detect terminal 500 is generated in the arrow direction (see arrow in FIG. 15). Even if the detect terminal 500 is moved in the direction of the −Z axis by this torque, friction is generated between the contact parts of the detect terminal 500 and the switch terminal 600, due to the corner 530a of the 1st contact part 530 of the detect terminal 500 moving along the sloped surface 620b of the 2nd contact part 620 of the switch terminal 600.

In addition, the stability of conductivity may be enhanced, due to maximizing the area over which friction occurs, because when the detect terminal 500 moves in the downward direction (−Z), the contact potential with the switch terminal 600 due to movement between the 1st contact part 530 and 2nd contact part 620 is greater than the pressure potential of the detect terminal 500, because the corner 530a of the 1st contact part 530 moves along the sloped surface 620b of the 2nd contact part 620 of the switch terminal 600.

Figure 17:
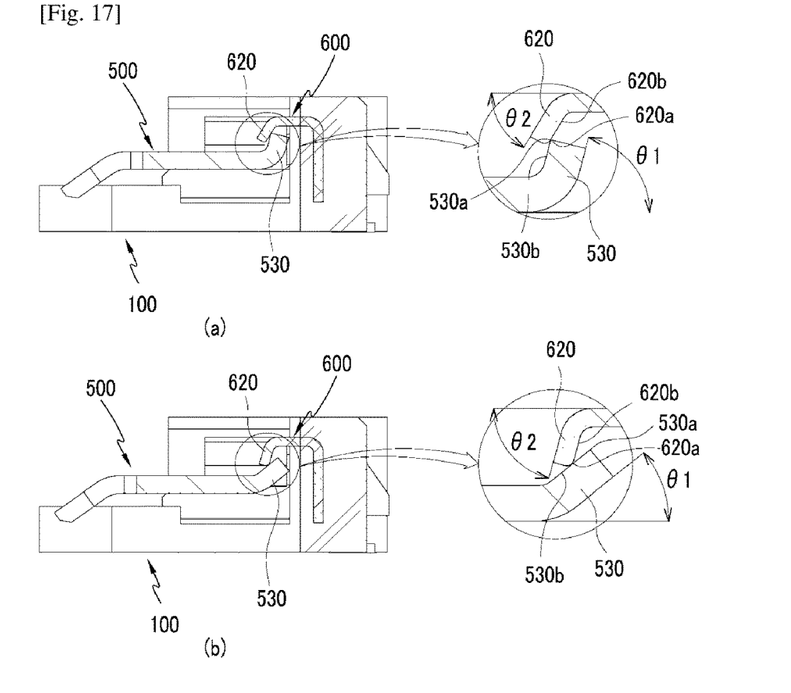
FIGS. 17A and 17B are cross-sections showing the zone of frictional contact between the detect terminal and switch terminal depending on the slope angle of the contact parts of the detect terminal and switch terminal.

FIGS. 17A and 17B are cross-sections showing the zone of frictional contact between the detect terminal and switch terminal depending on the slope angle of the contact parts of the detect terminal and switch terminal.

As shown in FIG. 17A, by configuring the upward-sloping angle $\theta 1$ of the 1st contact part 530 of the detect terminal 500 to be greater than the downward-sloping angle $\theta 2$ of the 2nd contact part 620 of the switch terminal 600, the corner 530a of the 1st contact part 530 of the detect terminal 500 may be caused to rub against the sloped surface 620b of the 2nd contact part 620 of the switch terminal 600.

In addition, as shown in FIG. 17B, by configuring the upward-sloping angle $\theta 1$ of the 1st contact part 530 of the detect terminal 500 to be less than the downward-sloping angle $\theta 2$ of the 2nd contact part 620 of the switch terminal 600, the corner 620a of the 2nd contact part 620 of the switch terminal 600 may be caused to rub against the sloped surface 530b of the 1st contact part 530 of the detect terminal 500.

Hereinabove, the card socket for use in electronic devices according to this disclosure has been described based on a preferred embodiment, but this disclosure is not limited to any specific embodiment, and a person of ordinary skill in the art of the relevant field will be able to make diverse modifications without departing from the claimed scope of this disclosure.

The invention claimed is:

1. A card socket for use in an electronic device, the card socket configured to receive a card/tray therein, the card socket comprising:

a housing having a base and a frame, the base extends from a front end thereof to a rear end thereof, the base having a through-hole provided proximate to the rear end thereof, the frame extends upwardly from at least a portion of an outer perimeter of the base, the housing defining an insertion space above the base and between the frame and the front and rear ends, the insertion space configured to receive the card/tray therein via the front end thereof, the insertion space defining a first direction from the front end to the rear end by which the card/tray is inserted and removed from the insertion space; and a card insertion confirmation terminal assembly operatively associated with the frame, the card insertion confirmation terminal assembly comprising:

a switch terminal having a switch fixing part and a switch contact part, the switch fixing part being fixed to the frame at or proximate to the rear end of the housing, the switch contact part extending from the switch fixing part;

a detect terminal having a detect fixing part, a detect contact part, and a push-guide part, the detect fixing part being fixed to the frame at or proximate to the rear end of the housing, the detect contact part being positioned within a rear part of the insertion space, the detect contact part extending in a cantilevered fashion from the detect fixing part in a second direction such that a free end of the detect contact part is defined, the second direction being transverse to the first direction, the free end of the detect contact part being configured to contact the switch contact part, the push-guide part extending forward toward the front end of the housing and downwardly toward the through-hole, the push-guide part being positioned distal from the free end of the detect contact part, wherein, upon insertion of the card/tray into the insertion space, the card/tray first contacts the card insertion confirmation terminal assembly by contacting the push-guide part, wherein further insertion of the card/tray into the insertion space causes the card/tray to push the push-guide part downwardly into the through-hole, wherein full insertion of the card/tray into the insertion space is achieved either upon the free end of the detect contact part making contact with the switch contact part or upon the free end of the detect contact part breaking contact with the switch contact part.

2. The card socket as defined in claim 1, wherein the detect contact part has a connecting surface and first and second sloping surfaces, the connecting surface being connected to the detect fixing part, the first sloping surface sloping downwardly from the connecting surface to the second sloping surface, the second sloping surface sloping upwardly from the first sloping surface to the free end, the push-guide part extending forwardly and downwardly from the second sloping surface.

3. The card socket as defined in claim 2, wherein the switch contact part is positioned below the second sloping surface of the detect contact part, wherein when full insertion of the card/tray into the insertion space is achieved the free end of the detect contact part makes contact with the switch contact part.

4. The card socket as defined in claim 3, wherein the frame has a catch lip extending into the insertion space, the catch lip being configured to prevent upward movement of the free end of the detect contact part.

5. The card socket as defined in claim 2, wherein the switch contact part is positioned above the second sloping surface of the detect contact part, wherein when full insertion of the card/tray into the insertion space is achieved the free end of the detect contact part breaks contact with the switch contact part.

6. The card socket as defined in claim 2, wherein the push-guide part is positioned below the connecting surface.

7. The card socket as defined in claim 1, wherein the push-guide part has a height that is less than a thickness of the base of the housing.

8. A card socket for use in an electronic device, the card socket configured to receive a card/tray therein, the card socket comprising:

a housing having a base which extends from a front end thereof to a rear end thereof, the base having a through-hole provided proximate to the rear end thereof, the housing defining an insertion space above the base and between the front and rear ends, the insertion space configured to receive the card/tray therein via the front end thereof, the insertion space defining a first direction from the front end to the rear end by which the card/tray is inserted and removed from the insertion space; and a card insertion confirmation terminal assembly operatively associated with the housing, the card insertion confirmation terminal assembly comprising:

a switch terminal having a switch fixing part and a switch contact part, the switch fixing part being fixed to the housing at or proximate to the rear end of the housing, the switch contact part extending from the switch fixing part;

a detect terminal having a detect fixing part, a detect spring part, a detect contact part and a push-guide part, the detect fixing part being fixed to the housing at or proximate to the rear end of the housing, the detect spring part being positioned within a rear part of the insertion space, the detect spring part extending in a cantilevered fashion from the detect fixing part in a second direction such that a free end of the detect spring part is defined, the second direction being transverse to the first direction, the detect spring part has a connecting surface and first and second sloping surfaces, the connecting surface being connected to the detect fixing part, the first sloping surface sloping downwardly from the connecting surface to the second sloping surface, the second sloping surface sloping upwardly from the first sloping surface to the free end, the detect contact part slopes upwardly and rearwardly from the second sloping surface, the detect contact part being configured to contact the switch contact part, the push-guide part extending forwardly and downwardly from the second sloping surface toward the front end of the housing and the through-hole, the push-guide part being positioned distal from the free end of the detect spring part, wherein, upon insertion of the card/tray into the insertion space, the card/tray first contacts the card insertion confirmation terminal assembly by contacting the push-guide part, wherein further insertion of the card/tray into the insertion space causes the card/tray to push the push-guide part downwardly into the through-hole, wherein full insertion of the card/tray into the insertion space is achieved either upon the detect contact part making contact with the switch contact part or upon the detect contact part breaking contact with the switch contact part, and wherein the switch contact part is positioned above the second sloping surface of the detect spring part.

9. The card socket as defined in claim 8, wherein the switch contact part slopes downwardly and forwardly from the switch fixing part.

10. The card socket as defined in claim 9, wherein a friction zone is formed between the detect contact part and the switch contact part when the detect terminal is pushed downward, so as to remove impurities or oxide films formed on the detect contact part and/or the switch contact part.

11. The card socket as defined in claim 10, wherein when the detect terminal is pushed downward, a friction potential with the switch terminal, that is caused by slope zone movement between the detect contact part and the switch contact part, is greater than a pushing potential of the detect terminal, due to movement of the detect contact part along a sloped surface of the switch contact part.

12. The card socket as defined in claim 10, wherein an upward slope angle of the detect contact part is greater than a downward slope angle of the switch contact part, whereby a corner of the detect contact part rubs against a sloped surface of the switch contact part.

13. The card socket as defined in claim 10, wherein an upward slope angle of the detect contact part is smaller than a downward slope angle of the switch contact part, whereby a corner of the switch contact part frictionally contacts a sloped surface of the detect contact part.

14. The card socket as defined in claim 8, wherein the push-guide part is positioned below the connecting surface.

15. The card socket as defined in claim 8, wherein the push-guide part has a height that is less than a thickness of the base of the housing.

* * * * *